United States Patent [19]

Heidrich

[11] Patent Number: 5,085,093
[45] Date of Patent: Feb. 4, 1992

[54] POWER SPLITTING TRANSMISSION

[75] Inventor: Gunther Heidrich, Burgberg, Fed. Rep. of Germany

[73] Assignee: BHS-Voith Getriebetechnik GmbH, Fed. Rep. of Germany

[21] Appl. No.: 702,838

[22] Filed: May 20, 1991

[30] Foreign Application Priority Data

May 29, 1990 [DE] Fed. Rep. of Germany ....... 4017226

[51] Int. Cl.$^5$ .............................................. F16H 57/12
[52] U.S. Cl. ........................................ 74/411; 74/409; 74/414; 464/69; 464/88
[58] Field of Search ................ 74/409, 410, 411, 401, 74/406, 414; 464/69, 88

[56] References Cited

U.S. PATENT DOCUMENTS

| 3,430,508 | 3/1969 | Pope et al. | 74/410 |
| 3,530,733 | 10/1968 | Heidrich | 74/410 |
| 4,876,908 | 10/1989 | Pengilly | 74/411 |

FOREIGN PATENT DOCUMENTS

| 370961 | 3/1923 | Fed. Rep. of Germany . |
| 1149958 | 6/1963 | Fed. Rep. of Germany . |
| 1173305 | 7/1964 | Fed. Rep. of Germany . |
| 1284238 | 11/1968 | Fed. Rep. of Germany ........ 74/410 |
| 1650857 | 3/1972 | Fed. Rep. of Germany . |
| 3622671 | 8/1987 | Fed. Rep. of Germany . |

Primary Examiner—Leslie A. Braun
Assistant Examiner—William O. Trousdell
Attorney, Agent, or Firm—Silverman, Cass & Singer, Ltd.

[57] ABSTRACT

A power splitting transmission, particularly for high energy and/or for high rotational speeds. Two sun gears are connected to the shaft of a drive starting and stopping mechanism and are coupled to each other by at least three double power splitting gears which are arranged equidistantly about the circumference of the sun gears and connected thereto by a coupling. The coupling and the connection with the shaft of the drive starting and stopping mechanism together function as a membrane coupling.

21 Claims, 6 Drawing Sheets

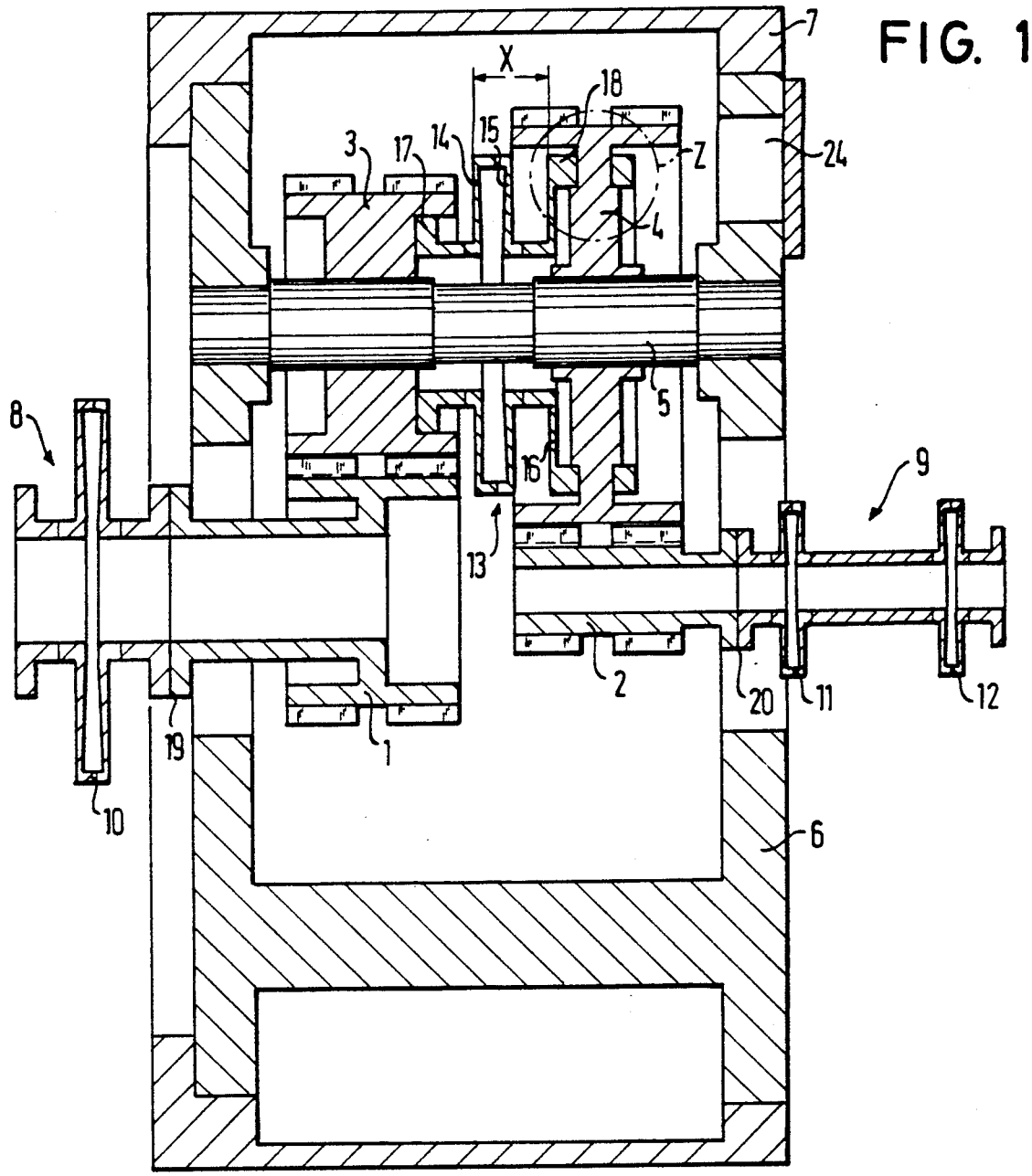
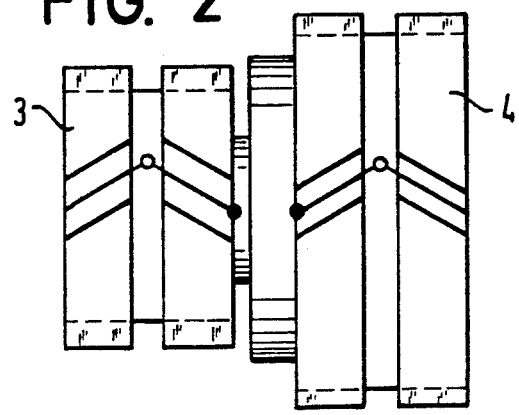

POWER SPLITTING TRANSMISSION

BACKGROUND OF THE INVENTION

1. Field of the Invention

This invention relates generally to a power splitting transmission, and more particularly to such a transmission for high energy and/or for high rotational speeds, in which central sun gears are connected with the shaft of an input drive mechanism and an output driven mechanism and are coupled with one another by means of two sets of at least three double power splitting gears each, where the at least three double power splitting gears in each set are arranged equidistantly about the circumference of their respective sun gears, and where the double power splitting gears in one set are connected to corresponding double power splitting gears in the other set by membrane couplings.

2. Description of the Prior Art

The tendency toward increasingly high energy and rotational speeds in engines and processing machines requires new types of construction for toothed wheel gearings in order to be able to meet such increased demands.

The difficulties which arise from such increased demands result primarily from the high rotational speeds and the size of such types of gears. The extent of these dynamic problems is apparent from the extent of the circumferential speeds which occur within the toothing units. This can be greater than 200 meters per second and, in other components, can sometimes be up to 300 meters per second.

A two-stage power splitting transmission with coaxial drive starting and stopping shafts, two sun gears and a stationary frame, is known in the art from German patent DE-AS 1 149 958. In this construction, attempt is made to compensate for manufacturing and toothing defects and thereby provide for uniform power distribution, by connecting the individual gears of the power splitting transmission with one another in a rotationally rigid manner by coupling teeth, whereby one double power splitting gear is axially conducted and the individual gears of the other double power splitting gears are axially movable. Additionally, separately manufactured coupling rings are provided, which, after being used to adjust the static tooth profile, are screwed and pegged to the individual gears. This type of construction requires a complicated overall mounting. It is necessary to initially mount both gear sets temporarily, to set the toothed gears into profile engagement, and then to subsequently detach the gear sets again so as to attach the coupling rings to the individual gears when they are returned to their initial position.

Despite such complicated measures, complete compensation for defects can not be achieved when rotating the toothed gears, because the defects occur irregularly about the circumference of the gears and also are of different magnitudes. Because of the wide range of tooth positions which occur, even gear meshing is not possible with this known type of transmission.

Furthermore, such construction requires making the double helical gearing axially self-adjusting because the teeth of the gear coupling are stressed by torque and are displaced axially against one another. In order to accomplish this, the frictional resistance between the tooth profiles of the gear coupling must be overcome, whereby the level of the frictional resistance is dependent upon the torque and the coefficient of friction which is present. Experience has shown that, in such cases, an increase in the coefficient of friction appears with increasing operating times. A greatly increased coefficient of friction can ultimately lead to blocking of the coupling.

An additional disadvantage is that the double helical gearings are, apart from the torque forces, additionally stressed by the friction resistance. The result is that the additional stress has to be considered in the design of the gear set, which leads in turn to an increase in the size of such types of transmissions.

Furthermore, the unsatisfactory articulation of a simple gear coupling does not allow the individual gears to be adjusted, without reciprocally influencing each other, to uniform profile support along the width of the tooth. This task is made more difficult by the fact that the tangential gear forces acting on both the individual gears are directed in opposite directions. This results in a displacement of the individual gears, likewise directed in opposite directions, within the framework of the same, which the bearing clearances provided permit. This displacement necessarily leads, in the positioning of only one simple gear coupling as a connecting element between the power splitting gears, to an obliquely inclined positioning of these gears, and thereby to a support of the profiles which is damaging to one side.

It is, furthermore, a great disadvantage in the positioning of gear couplings as a connecting element in the component groups of the sun gears and power splitting gears, that these component groups cannot be counterbalanced in the mounted condition. The main causes for this are the clearances present during stoppage and during rotation. Among these clearances are the profile clearance, the centering clearance, and the enlargement of these clearances through the greater enlargement of the outer, larger part relative to the inner, smaller part. This disadvantage is particularly great at very high rotational speeds. The unbalancing forces which thereby arise can then easily reach levels which become a serious danger for the transmission, but also for the entire set of machinery, such as, for example, abrasion and corrosion of the teeth, damage to the supports, and breakage of the shaft.

During the use of double power splitting gears, the rotationally rigid connection of the individual gears by means of gear coupling also leads to the disadvantage that, despite the self-adjustment of the sun gears, a power splitting to more than three branching lines is, because of the lack of elasticity, not possible and larger transmissions therefore once again result.

Another construction is shown in German patent DE-PS 1 650 857 which discloses a multiple path transmission for large energy applications. Said construction provides the solution to the problem, in the case of double power splitting transmissions, of compensating the displacement of the individual gears directed by the gear forces in an opposing direction. Furthermore, the influence of the unavoidable defects in production and toothing during the operation should be further reduced and, specifically so, with the smallest possible expenditure in space and construction. A simple helical gearing with a pressure cog is provided as the toothing.

This construction proposes to attain compensation for defects during the operation through the rotational elasticity of the slotted coupling sleeve. In order to be able to mount a transmission constructed in this manner, it is necessary, during the production of the toothing units, that the position of the operating toothing units to the coupling toothing units be precisely equal in all of the power splitting lines. This requirement can, however, only be fulfilled by precise manufacturing means at great expense.

It is one additional constructional characteristic of this construction that the axial guidance of the gear sets with the sun gears is carried out in a rigid manner by means of stopping rings. Additional undesirable stresses result on the toothing units with this construction. Furthermore, this transmission partly entails, through the use of gear couplings with the sun gears and double power splitting transmissions, the same disadvantages as in the construction shown in German patent DE-AS 1 149 958. These are the following: frictional resistances in the gear couplings during axial movements, and thereby additional stresses on the toothing units and pressure cogs, as well as additional dynamic overloads through reduced balancing quality as the result of the complete balancing of the components of the sun gears and the double power splitting transmissions.

Another spur gear/planetary transmission with a self-activated compensation of gear pressure is known from German patent DE-AS 1 173 305. This construction involves pure planetary gearings of the one- and two-stage construction type. In accordance with the patent, a spur gear/planetary transmission is to be created, which can be built in a less expensive manner, as well as lighter and cheaper. Such a construction is not suitable for higher energy and rotational speeds. The types of couplings which are used represent an additional impediment for attaining higher energy and rotational speeds in the known constructions. All of these types of constructions are suitable only for slow or average rotational speeds. For example, in spring/plate couplings, circumferential speeds of approximately 40 meters per second are the maximum values which are presently attainable.

For the solution of the task stated above, there is additionally proposed a two-stage planetary gearing, in which the planet support of the first stage is connected with the sun gear of the second stage by means of a screw spring coupling or bending deflector, an axially rigid shaft, or a rotationally-rigid spring-plate coupling.

A toothed wheel gearing with subdivided gears is also known from German patent DE-PS 370 961. In this patent, the task consisted of achieving, in the case of herringbone gears, a uniform, precise application and support of the teeth of both halves of the portion of the herringbone part with one another. The halves of the herringbone parts are, for this purpose, guided into two supports and connected by means of a single-pivot membrane coupling, without an axial displacement or rotation of the parts against one another being possible. Furthermore, the coupling should permit an oblique placement of the axes of the gearing parts.

An additional known structure is shown in German patent DE-PS 3 622 671 which shows a thrust plate arrangement, particularly for planetary gears within a planetary support. This consists of thrust plates positioned internally and externally, which are provided with recesses for supplying lubricating oil to the support apparatus. There should be attained by this means, even at high rotational speeds of the planetary gears, an absolutely reliable lubrication and cooling of the needle units of a needle supporting apparatus rotating at half rotational speed.

SUMMARY OF THE INVENTION

In contrast to the above, the task of the present invention consists of so constructing a power splitting transmission of the type stated above that, without large expenditure in construction and costs, large outputs and high rotational speeds can be achieved.

This task is achieved, in accordance with the invention, by the coupling and/or the connection with the specific shaft of the input drive mechanism and output driven mechanism being constructed as a membrane coupling. This structure is advantageous in that the high elasticity or low spring rigidity of the membrane couplings in sun gears and double power splitting transmissions, result in small resistances in the adjusting movements (radial, axial) to equal torque division and in the compensating movements during shaft displacement (radial, axial). This results in an improved torque division, above all in the area of the high rotational speeds with large necessary mass acceleration. The small additional stresses, such as, for example, on double helical gearings during compensation for thermal expansions, as well as the lack of increase in the lower spring rigidity with an increase in the operating time, constitute an additional advantage.

The high elasticity of the membrane coupling of the double power splitting transmissions additionally makes possible, through the increased distance of the membrane disks from one another, and he double articulation thereby achieved, a compensation of the opposed displacement of the individual gears, under the tangential forces. Oblique positions of the individual gears with high peripheral stresses with toothing and support are thereby advantageously prevented. The necessary level of the distance of the membrane disks of the membrane coupling of the double power splitting transmissions is based on the level of the clearances present and the external diameter of the membrane disks.

In membrane couplings, the thin membrane disks are pressed into rotation by the torque which is conveyed from the inside to the outside, and vice versa. The level of rotational elasticity resulting therefrom is dependent on the level of the elastic membrane surface, the membrane thickness and the number of membrane disks positioned one after another and acting in a cumulative manner. Although the rotational elasticity which can thereby be attained is relatively small, it still suffices to compensate the toothing and production defects during operation, and to permit the positioning of more than three double power splitting transmissions.

The membrane couplings operating free of clearance furthermore advantageously permit the highest balancing quality. Furthermore, parts rigidly connected with the membrane coupling, such as, for example, sun gears or individual gears of the double power splitting transmissions, can be balanced while completely mounted as a construction group. Consequently, even with the highest rotational speeds, a good and completely vibration-free operating behavior is ensured. The dynamic additional forces on, for example, the toothing units, supports and shafts are thereby considerably reduced as well.

The static meshing adjustment of the invention advantageously makes unnecessary production measures which are complicated and affected by defects, in the assignment of the parts of the complete double power splitting transmissions. These can thus be produced in a more cost-effective manner, without taking the positions into consideration. Costly disassembly, follow-up actions and remountings are also advantageously eliminated.

The axial guidance of the transmission gear sets by means of the input drive and output driven mechanisms and the axial elasticities of the membrane couplings also eliminates the position fixings which are otherwise conventional. The guidance in the membrane couplings additionally favors the free self-adjustment of the gear sets to a gearing-specific central operating position, and leads to a very high level of uniform torque splitting.

The construction of the transmission in accordance with the present invention furthermore also permits other types of execution, if special reasons make this necessary. For this purpose, a double power splitting transmission can be constructed by means of spacing disks to the guide gear. Furthermore, the membrane couplings in accordance with the invention can also accommodate spring path blocking or spring path limitation.

There thereby results, in accordance with the invention, a completely new power splitting transmission, which is in a position to fulfill even the increasingly high requirements. The construction is suited for all types of toothing which might be employed in such types of gearings, as well as also for all types of power splitting transmissions with double power splitting transmissions and, in part, also in those which have simple power splitting transmissions, that is to say, those which have sun gears and hollow gears.

The forms of execution of the power splitting transmission in accordance with the invention thus have essentially the following characteristics:

the sun gears which are placed into the power splitting transmissions in an adjustable manner are connected, by means of one-stage or two-stage membrane couplings, with the shafts of the input drive and/or output driven mechanism;

the individual sun gears are connected with each other by means of two sets of at least three double power splitting gears each, where the at least three double power splitting gears in each set are arranged equidistantly about the circumference of their respective sun gears, and where the double power splitting gears in one set are connected to corresponding double power splitting gears in the other set by membrane couplings;

the axial guidance of the transmission gear sets is carried out by means of the independent, axially-guided, input drive and output driven mechanisms and the axial elasticities of the membrane couplings;

the membrane coupling of the double power splitting gears has two or more membrane disks;

the torque transmission in the membrane coupling of the double power splitting gears is mainly carried out on both sides by means of screws by means of friction engagement, during standstill, the adjustment to complete meshing is carried out by means of screw connections and oblong holes in the larger individual gears;

the size of the oblong holes is equal to or greater than double the necessary adjustment angle, whereby this corresponds to half the tooth distribution in the frontal section of the adjusting gear;

the axial guidance of the transmission gear sets is alternately carried out by means of the input drive and/or output driven mechanism and the membrane coupling coordinated therewith, with axial spring path blocking;

the axial guidance of the transmission gear sets is alternately carried out on only one double power splitting transmission, by means of spacing disks;

the axial guidance of the drive starting and/or stopping mechanism is carried out on only one double power splitting gear by means of spacing disks, as well as on the input drive and/or output driven membrane coupling by means of axial spring path blocking;

in order to balance out the thermal expansions of the input drive and/or output driven mechanism shaft by means of membrane couplings, these are, depending on their axial rigidities, equipped with different spring path stop units;

in order to increase the rigidity in the axial adjustment movements of the gears, the membrane couplings are mounted in a prestressed manner, such as, for example, pressed or drawn.

The characteristics of the invention are also applicable in all other types of power splitting transmissions with double power splitting transmissions. Furthermore, the positioning of one or two jointed membrane couplings to adjustably guided sun gears is also advantageously applicable in power splitting transmissions with simple power splitting gears. There also exists the possibility of use of the invention in power splitting transmissions with straight toothing.

BRIEF DESCRIPTION OF THE DRAWINGS

FIG. 1 is a longitudinal sectional view taken through a power splitting transmission with double helical transmission;

FIG. 2 is an elevational view showing the coordination of the toothing units in double power splitting gears;

DESCRIPTION OF THE PREFERRED EMBODIMENTS

Figure 3:
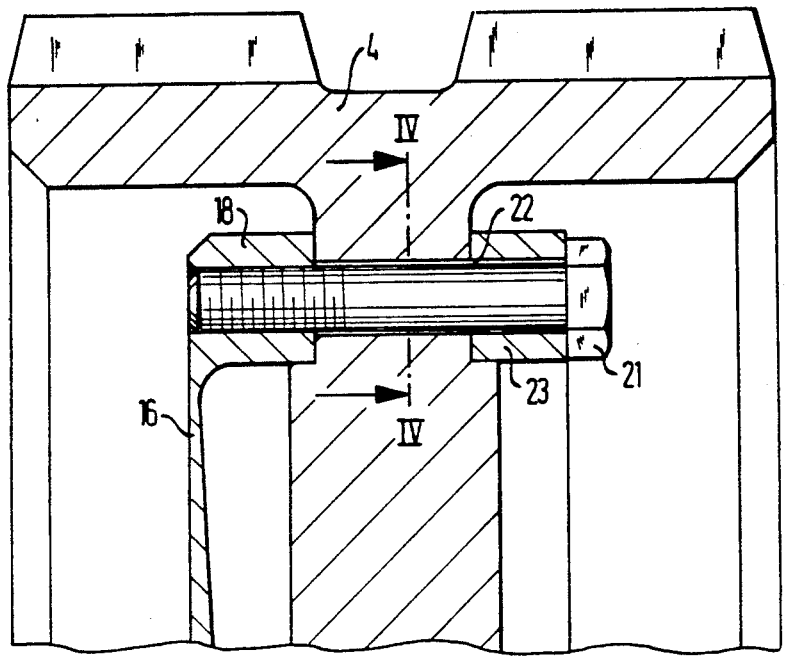
FIG. 3 is an enlarged sectional view of the portion indicated as "Z" in FIG. 1 showing the configuration of the torque transmission on the larger individual gear of the double power splitting gears.

As seen in FIG. 1, the power splitting transmission has input drive and output driven toothed gears, also called sun gears, which are guided, in an adjustable manner, into three or more individual or double power splitting gears 3 or 4. The individual gears 3, 4 are supported on bolts 5 in a rotatable manner. The bolts are attached within a frame 6 which is encircled by a casing 7.

Membrane couplings 8 and 9 are positioned within the sun gears 1 and 2 to provide a flexible connection to the input drive and output driven mechanisms and the shafts therefor (not shown). The membrane coupling 8 thereby has, for example, only one flexible articulation 10. In contrast, the membrane coupling 9 has, for example, two articulations 11 and 12.

A membrane coupling 13, which consists, for example, of three membrane disks 14, 15 and 16, is positioned between the two individual gears 3 and 4 to provide a flexible connection for said two gears. The membrane coupling 13 is connected to each flange 17 and 18 by means of screw connections with the individual gears 3 or 4.

The axial guidance of the gear sets 1, 3 or 2, 4 is carried out, in the form of execution shown in FIG. 1, through the independent axially conducted input drive and output driven mechanisms, and the axial elasticities of the membrane coupling 8 or 9, and 13 stated above.

As also seen in FIG. 1, membrane couplings 8 and 9 are connected to the sun gears 1 or 2 by means of screwed flanges 19 and 20. Alternative to this separable arrangement, the membrane couplings 8 and 9 can be permanently connected to the corresponding sun gears 1 and 2, such as by electron beam welding, for example FIG. 2 illustrates the necessary cooperative position of the toothing units with three or more double power splitting gears. This positioning was, in the previously known types of construction, attained only imprecisely through production measures and through static adjustment for only one tooth position.

FIG. 3 shows the connection of the screw, which can be adjusted to uniform meshing, with the larger individual gear 4. The transmission of torque from the individual gear 4 to the membrane disk 16 is carried out by means of friction closure by screws 21, which can be selected to have uniform weights. The adjustment of the precise angular position is made possible by the oblong holes 22 formed in the individual gear 4, whereby a ring 23 serves to cover the oblong holes 22 and to support the heads of the screws 21.

Figure 4:
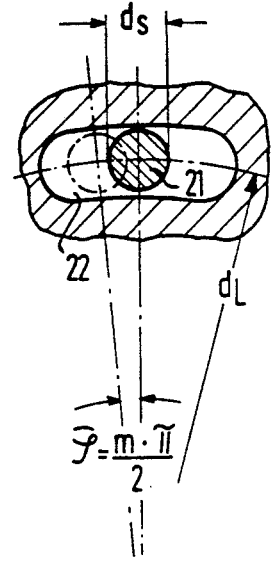
FIG. 4 is a sectional view taken along the line IV—IV of FIG. 3 in the direction indicated generally, showing the configuration of the oblong holes.

FIG. 4 illustrates the design principle for the length of the oblong hole 22. This length is accordingly computed along the circle of the screw hole, $d_L$:

$$L > 2p + d_s > m \cdot \pi + d_s.$$

in which:
m is the modulus of the toothing of the individual adjusting gear 4 in a frontal view; and
$d_s$ is the diameter of the shaft of the screw.

The adjustment to complete meshing to be carried out during standstill is carried out in the following manner:

First, placement of the gear sets in accordance with FIG. 1 in a vertical position without casing 7 in the frame 6, whereby the screws 21 are screwed to an individual gear 4 with the necessary operating starting torque, but, in all other individual gears 4, are only slightly screwed. In this condition, all double power splitting gears can be brought into mesh with the sun gears 1 and 2 through rotation into the oblong holes 22.

The meshing adjustment is carried out by additional rotation of the individual adjustment gears 4 in the direction of the load. During such operation it is necessary to keep the sun gear 1 stationary. For improvement of precision of such adjustment, the sun gears 1 and 2 can also be fixed radially and axially in their operating position by means of simple devices.

After the adjustment, all of the screws 21 are screwed into the openings 24 in the frame 6 by means of the operating starting torque. After that, the frame 6 can be installed in the casing 7, and operation of the transmission is commenced.

Figure 5:
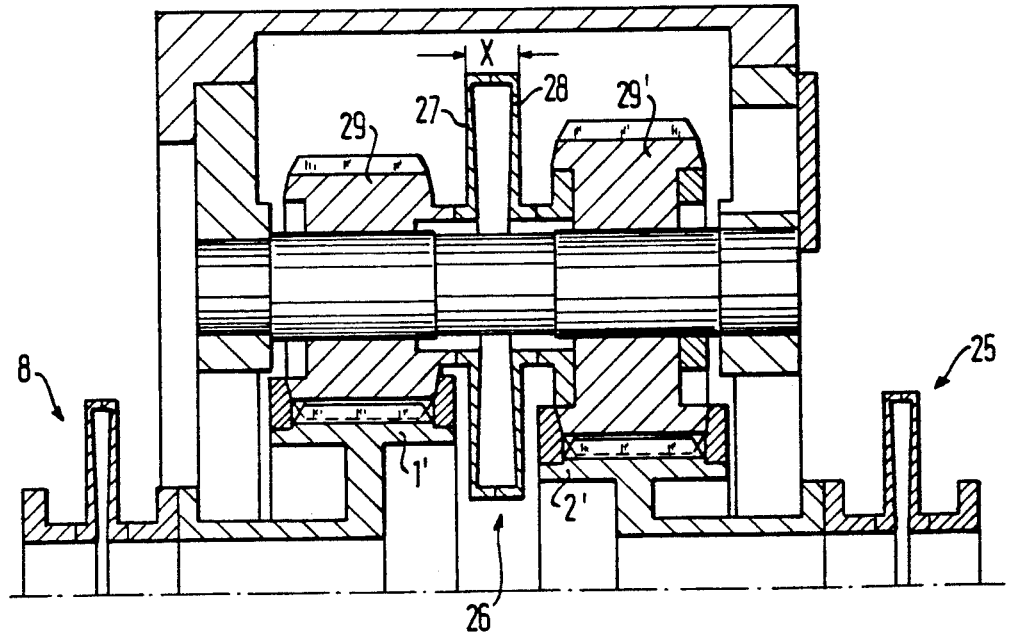
FIG. 5 is a longitudinal sectional view taken through a power splitting transmission with simple helical transmission and pressure cogs.

The advantage of the manner of construction in accordance with the invention consists, as shown in FIG. 1, of the simple manufacture of the gear set parts. It is not necessary to adjust for the mutual coordination of the parts, either in the toothing units or in the screw connections of the flanges 17 and 18. After the adjustment, neither demounting nor subsequent work on the parts and remounting are required FIG. 5 shows one form of application of the invention with a simple oblique toothing and pressure cogs for compensating the axial tooth forces. In contrast to the form of application shown in FIG. 1, a membrane coupling 25 is only carried out in a singly articulated manner. An additional membrane coupling 26 consists of only two membrane disks 27 and 28, whereby the membrane disk 27 is fixedly connected, for example, by means of electron beam welding, with the individual gear 29, while the connection with the other individual gear 29' is carried out by means of screw connections in the manner stated above. The other membrane coupling 8 on the input drive or output driven gear is, again, formed in a singly-articulated manner analogous to the form of construction shown in FIG. 1.

Figure 6:
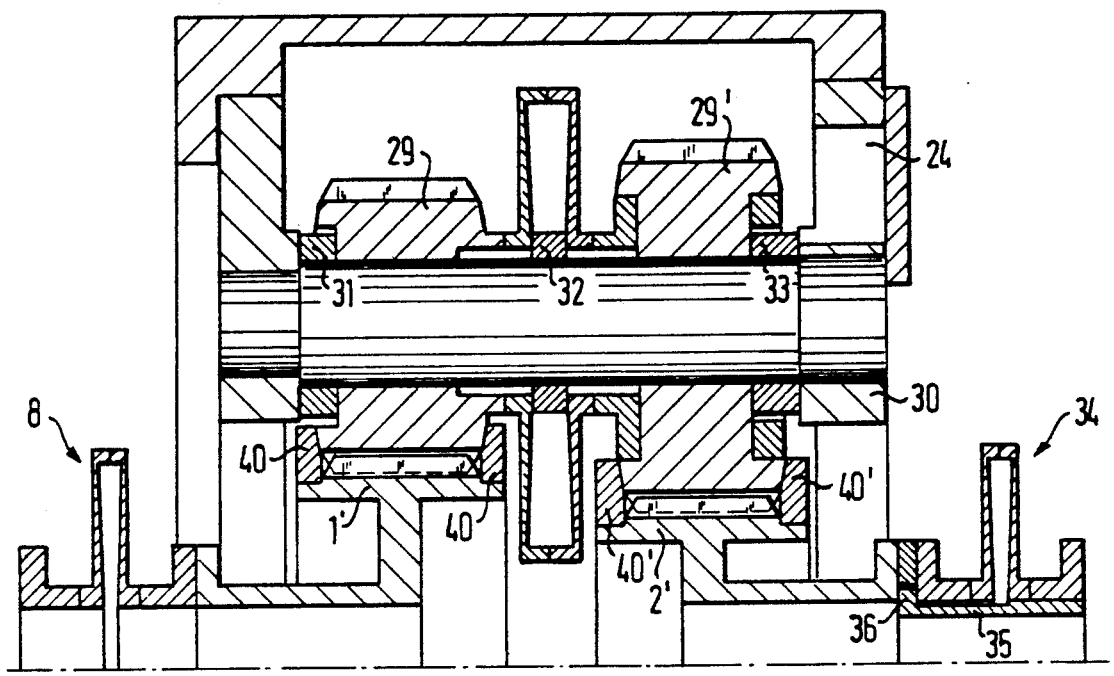
FIG. 6 is a longitudinal sectional view taken through a power splitting transmission with axially-guided double power splitting gear and sun gear membrane coupling with axial spring path block.

FIG. 6 illustrates a transmission similar to that of FIG. 5, but with a double power splitting gear conducted in the frame 30 axially over the spacing disks 31, 32 and 33 and with a slight clearance. All other double power splitting gears are conducted axially to the sun gears 1' or 2' exclusively by means of pressure cogs 40, 40'.

A membrane coupling 34 positioned on the sun gear 2' has an axial spring path blocking unit 35. In order to thereby make an angular deviation of the articulation of this membrane coupling 34 possible, a band 36 is fitted, with slight clearance on both sides, to the corresponding flange connection.

Figure 7:
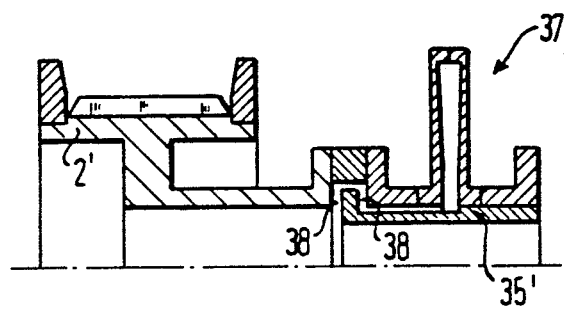
FIG. 7 is a sectional view showing the sun gear membrane coupling of the gearing shown in FIG. 6, but with axial spring path limitation.

FIG. 7 shows a membrane coupling 37, as it is mounted to the sun gear 2'. In this embodiment, an axial spring path limiting unit is applied, in contrast to the form of execution in accordance with FIG. 6. This embodiment is distinguished by having greater clearance 38 on both sides. The size of this clearance 38 depends on the anticipated spring path; the foreseeable level of thermal expansion of the connected machine shaft (not shown); and the levels of rigidity, i.e., the foreseeable spring paths for the expansion compensation with membrane couplings.

On the whole, through the use of membrane couplings with a power splitting transmission, a construction is created which is, with a simple construction shape and economical formation, also advantageously suitable for high energies and for high rotational speeds.

Figure 8:
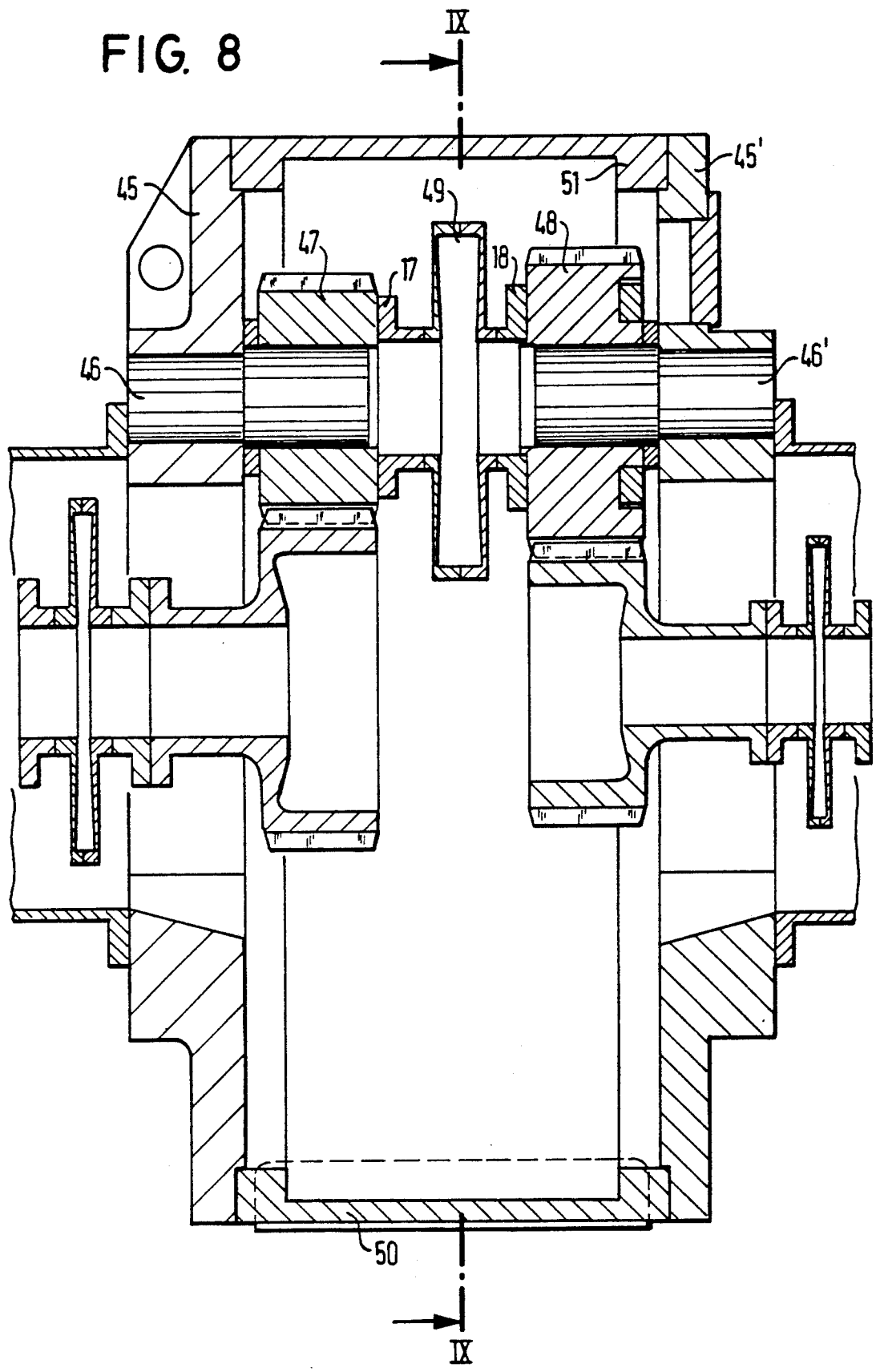
FIG. 8 is a longitudinal sectional view taken through a power splitting transmission with straight toothing and support bolts for the individual gears attached to one side in the casing cover.

FIG. 8 shows one form of application of the invention with straight gearing and support bolts 46, 46', which are attached on one side of the casing cover 45, 45' for the individual gears 47, 48. This type of support bolt attachment provides a simple and cost favorable construction of the transmission, with the further advantage of the simple mounting and disassembly of the membrane couplings 49 and the individual gears 47, 48 during, for example, inspection of the transmission, or during maintenance work. It is thus possible, after loosening the screw connections on the flanges 17, 18, to dismantle the membrane coupling 49, to displace both the individual gears 47, 48 one after another to the position of the removed membrane coupling 49, and to subsequently remove the same.

The manner of construction in accordance with FIG. 8 accordingly does not require, for the removal of these parts, the removal of the support bolts 46, 46', as is, however, the case with the types of construction shown in FIGS. 1, 5 and 6. In this form of application, the design requirement is fulfilled: the length of the membrane coupling 49 is greater than the length of the individual gears 47, 48.

The placing of the support bolts 46, 46' in the casing covers 45, 45' in accordance with FIG. 8 additionally replaces the conventional, expensive manner of construction of the frame 6 shown in FIGS. 1, 5 and 6.

The manner of construction in accordance with FIG. 8 makes possible, furthermore, the removal of parts, without the transmission having to first be completely removed from the apparatus. This is achieved by dividing the casing into one lower part 50 with attachment feet, and into an upper part 51.

Figure 9:
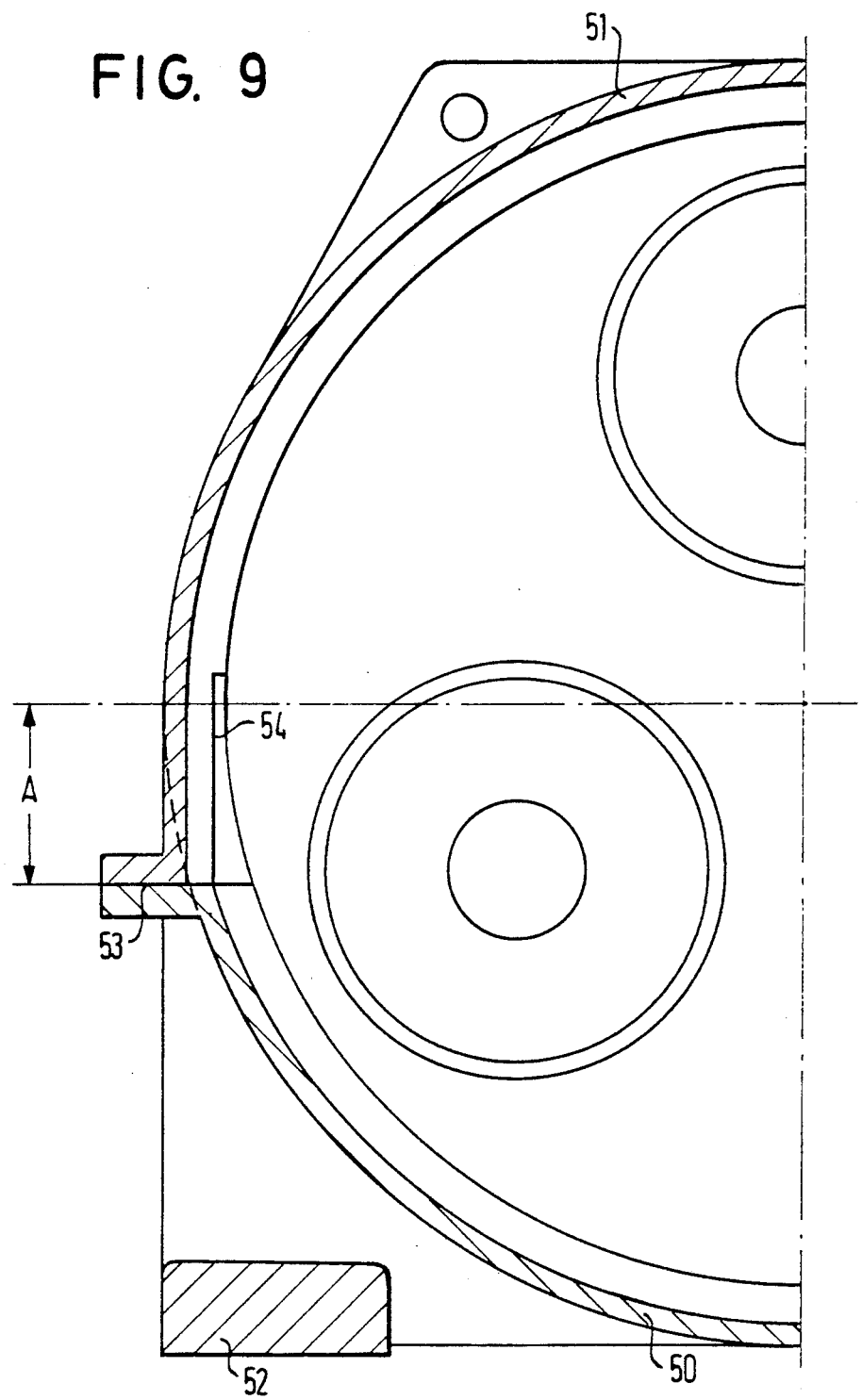
FIG. 9 is a lateral sectional view taken along the line IX—IX of FIG. 8 in the direction indicated generally.

FIG. 9 shows in section the side view of the FIG. 8 embodiment, with the division of the casing into a lower part 50 with attachment feet 52 and into an upper part 51. The horizontal dividing plate 53 is shifted downwardly, in contrast to the conventional practice, out of the rotational axis, by the distance "A". There is thereby achieved, after the removal of the upper part 51, improved accessibility for the removal of both the lower membrane coupling or the individual gears. The removal of the upper part 51 is, despite the centering in the casing covers 45, 45', made possible through the recess along the contour 54.

Figure 10:
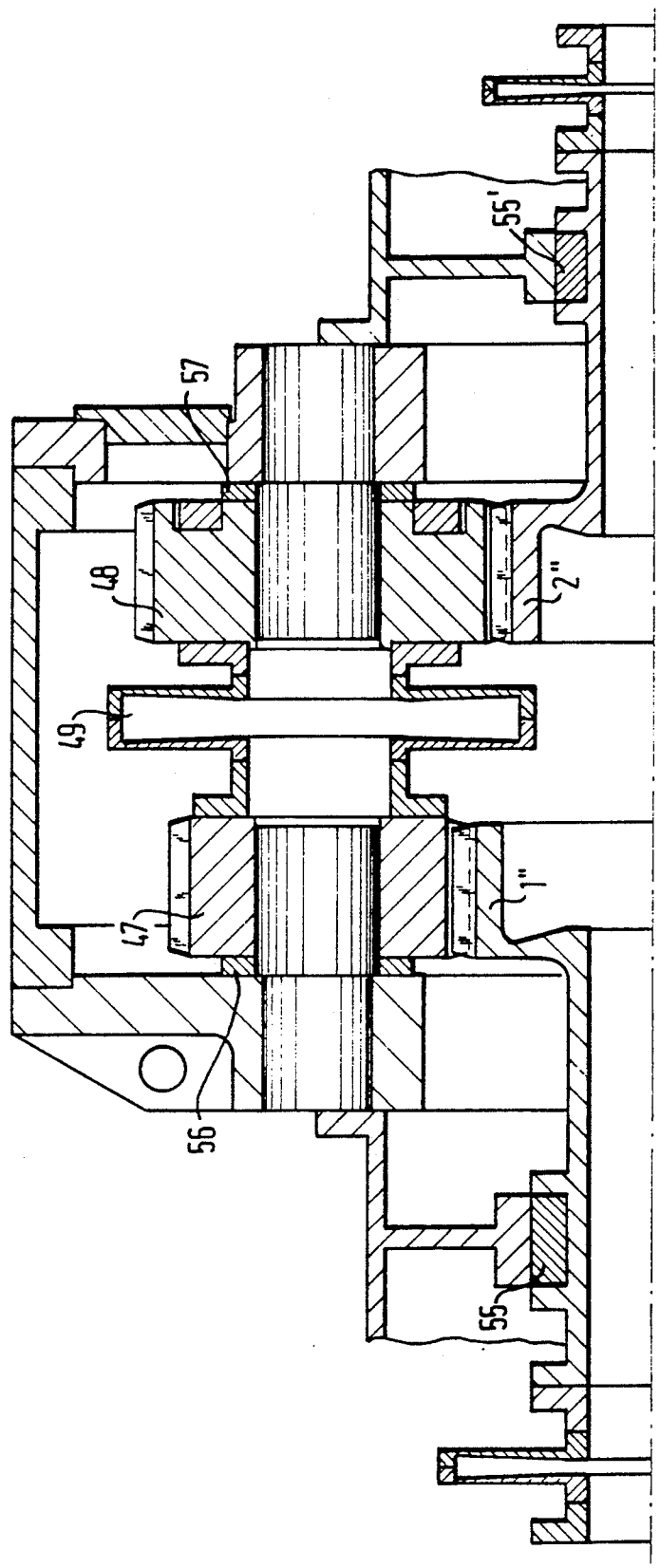
FIG. 10 is a longitudinal sectional view taken through the power splitting transmission shown in FIG. 8 including a support on each of the sun gears.

FIG. 10 illustrates one form of application of the invention of FIG. 8, but with one support each 55, 55' on the sun gears 1", 2". The second support position for the sun gear shaft is formed by the meshings of the sun gear 1", 2" with the three or more individual gears 47 or 48. The axial guidance of the double power splitting gears is provided by means of the spacing disks 56, 57, and the rigidity of the membrane coupling 49.

The types of constructions in accordance with FIGS. 1 to 10 advantageously permit, depending on the type of support to be applied—i.e., depending on the rotational speed—either slide or roller bearings.

We claim:

1. A power splitting transmission comprising first and second axially aligned sun gears, an input drive mechanism having an input shaft, an output driven mechanism having an output shaft, said first sun gear being connected to said input shaft, said second sun gear being connected to said output shaft, a first set of at least three double power splitting gears connected to and being uniformly positioned over the circumference of said first sun gear, a second set of at least three double power splitting gears connected to and being uniformly positioned over the circumference of said second sun gear, said first and second sun gears being connected to each other through said first and second sets of double power splitting gears, said first and second sets of double power splitting gears being coupled to each other through first membrane couplings, a second membrane coupling located between said input shaft and said first sun gear, and a third membrane coupling located between said output shaft and said second sun gear, whereby said membrane couplings allow rotational axial displacement between respective elements which they connect.

2. A transmission as claimed in claim 1 in which the first and second sun gears are adjustably connected to the input shaft and the output shaft respectively, said adjustable connections being between flanges on the first and second sun gears and the second and third membrane couplings respectively.

3. A transmission as claimed in claim 2 in which the flanges are fastened to the sun gears.

4. A transmission as claimed in claim 3 in which the flanges are welded to the sun gears.

5. A transmission as claimed in claim 1, in which the first membrane couplings include at least two membrane disks positioned between the double power splitting gears, said membrane disks being connected to the double power splitting gears by flanges.

6. A transmission as claimed in claim 5 in which one disk of the membrane coupling is attached to its associated power splitting gear by adjustable screws passing through said flange.

7. A transmission as claimed in claim 6 in which the power splitting gears are formed with oblong holes and said adjustable screws are positioned within said holes.

8. A transmission as claimed in claim 7 in which the size of each oblong hole is equal to or greater than double the adjustment angle of the hole.

9. A transmission as claimed in claim 8 including a ring to cover the oblong holes, said ring forming a bearing support for the heads of the adjustable screws.

10. A transmission as claimed in claim 5 in which one of the membrane disks is permanently connected to one of the double power splitting gears.

11. A transmission as claimed in claim 10 in which the gears are positioned in a frame surrounded by a casing.

12. A transmission as claimed in claim 6 in which the frame is formed with openings through which said screws pass.

13. A transmission as claimed in claim 11 including spacing disks associated with the double power splitting gear for guiding the same within the frame.

14. A transmission as claimed in claim 13 in which the third membrane coupling connected with the second sun gear includes an axial spring path blocking unit.

15. A transmission as claimed in claim 13 in which the third membrane coupling connected with the second sun gear includes an axial spring path limiting unit with clearance on both sides.

16. A transmission as claimed in claim 1 in which the third membrane coupling includes spring path limiting units.

17. A transmission as claimed in claim 1 in which the first membrane couplings are mounted in a prestressed manner.

18. A transmission as claimed in claim 1 in which the double power splitting gears are supported on separately constructed bolts, said bolts being attached in a casing having a cover.

19. A transmission as claimed in claim 18 in which the double power splitting gears are connected with one another by flanges and the first membrane couplings, whereby the width of the double power splitting gears is smaller than the total width of the flanges and of the first membrane couplings.

20. A transmission as claimed in claim 18 in which the casing is formed of two parts with a separating plane displaced downwardly by a distance relative to the axis of the transmission, one upper part of the casing being provided with a recess.

21. A transmission as claimed in claim 18 in which the sun gears are supported in a radial-axial manner by a support mounting and the sun gears mesh with the double power splitting gears.

* * * * *